US012135799B2

(12) United States Patent
Trimmer

(10) Patent No.: US 12,135,799 B2
(45) Date of Patent: Nov. 5, 2024

(54) HARDWARE STORAGE UNIQUE KEY

(71) Applicant: STMicroelectronics (Grenoble 2) SAS, Grenoble (FR)

(72) Inventor: Mark Trimmer, Coublevie (FR)

(73) Assignee: STMicroelectronics (Grenoble 2) SAS, Grenoble (FR)

(*) Notice: Subject to any disclaimer, the term of this patent is extended or adjusted under 35 U.S.C. 154(b) by 275 days.

(21) Appl. No.: 17/654,914

(22) Filed: Mar. 15, 2022

(65) Prior Publication Data

US 2022/0300624 A1    Sep. 22, 2022

(30) Foreign Application Priority Data

Mar. 18, 2021    (FR) ........................................ 2102718

(51) Int. Cl.
*G06F 21/60*    (2013.01)
*G06F 7/58*    (2006.01)

(52) U.S. Cl.
CPC ............ *G06F 21/602* (2013.01); *G06F 7/588* (2013.01)

(58) Field of Classification Search
CPC .............................. G06F 21/602; H04L 1/244
See application file for complete search history.

(56) References Cited

U.S. PATENT DOCUMENTS

| 8,484,486 | B2 * | 7/2013 | Deierling | .............. G06F 21/602 |
| | | | | 713/193 |
| 2005/0228605 | A1 * | 10/2005 | Ribo | ...................... H04L 1/244 |
| | | | | 702/108 |
| 2019/0036706 | A1 | 1/2019 | Detert | |

FOREIGN PATENT DOCUMENTS

| CN | 100565562 C | 12/2009 |
| JP | 2013122800 A | 6/2013 |

* cited by examiner

*Primary Examiner* — Barbara B Anyan
(74) *Attorney, Agent, or Firm* — Slater Matsil, LLP

(57) ABSTRACT

The present disclosure relates to a method wherein a random value, generated by a random number generator, is stored, by a finite state machine coupled to the generator by a first dedicated bus, in a memory area of a non-volatile fuse-type memory of an integrated circuit, the memory area being only accessible by the finite state machine.

20 Claims, 4 Drawing Sheets

HARDWARE STORAGE UNIQUE KEY

CROSS-REFERENCE TO RELATED APPLICATIONS

This application claims priority to French Patent Application No. FR 2102718, filed on Mar. 18, 2021, which application is hereby incorporated by reference herein in its entirety.

TECHNICAL FIELD

The present disclosure generally relates to electronic circuits and, in particular embodiments, protecting data stored in non-volatile fuse-type memory.

BACKGROUND

Generally, the operation of an electronic device with an integrated circuit requires the execution of software codes or proprietary protocols used along the circuit lifetime. The data representing the software codes and proprietary protocols are linked to certain instances of the circuit but typically require being stored in an externally accessible non-volatile type memory. Such data are generally considered critical in terms of confidentiality and need to be encrypted to be unable to be used in case of an attack on the circuit.

The encryption and the decryption of data are generally performed by a cryptographic processor, which requires one or a plurality of cipher keys stored in a non-volatile memory of the device. Generally, the control of the generation of these cipher keys and their storage in a non-volatile memory are executed by a non-secure processor.

However, these cipher keys should not be accessible to any potential attacker of the circuit. Any physical connection between the non-secure processor and the non-volatile memory containing the cipher keys could be exploited by attackers.

SUMMARY

There is a need to improve the security of data stored in irreversibly-programmable non-volatile memories of integrated circuit devices.

An embodiment overcomes all or part of the disadvantages of known devices with integrated circuits.

One embodiment provides a method wherein a random value, generated by a random number generator, is stored, by a finite state machine coupled to the generator by a first dedicated bus, in a memory area of a non-volatile fuse-type memory of an integrated circuit, the memory area being only accessible by the finite state machine.

One embodiment provides an integrated circuit comprising a random number generator, a finite state machine coupled to the generator by a first dedicated bus, and a non-volatile memory, wherein a random value generated by the generator is stored by the state machine in a memory area of the non-volatile memory, the memory area being only accessible by the finite state machine.

According to an embodiment, the memory area can only be programmed by the finite state machine.

According to an embodiment, the first dedicated bus exclusively couples the finite state machine to the random number generator.

According to an embodiment, at each reset phase of the circuit, the content of the memory area is loaded by the finite state machine into volatile storage elements.

According to an embodiment, a second dedicated bus exclusively couples the volatile memory elements to a first processor.

According to an embodiment, the first processor is a cryptographic engine.

According to an embodiment, the finite state machine and the volatile memory elements are contained in a wrapper.

According to an embodiment, a transition of the circuit in and out of a state allowing the execution of a scan test generates the deleting of the content stored in the volatile storage elements.

According to an embodiment, the non-volatile memory is disconnected from the circuit when the circuit is in the state, allowing a scan test execution.

According to an embodiment, the finite state machine locks the memory area after storing the random value if the random value stored corresponds to the random value generated by the generator.

BRIEF DESCRIPTION OF THE DRAWINGS

Other advantages and features of the disclosure will become apparent upon examining the detailed description of implementations and embodiments, which are in no way limiting, and of the appended drawings wherein.

DETAILED DESCRIPTION OF ILLUSTRATIVE EMBODIMENTS

This disclosure provides many applicable inventive concepts that can be embodied in a wide variety of specific contexts. The particular embodiments are merely illustrative of specific configurations and do not limit the scope of the claimed embodiments. Features from different embodiments may be combined to form further embodiments unless noted otherwise.

Variations or modifications described to one of the embodiments may also apply to other embodiments. Further, it should be understood that various changes, substitutions, and alterations can be made herein without departing from the spirit and scope of this disclosure as defined by the appended claims.

Like features have been designated by like references in the various figures. In particular, the structural or functional features that are common among the various embodiments may have the same references and may dispose identical structural, dimensional and material properties.

For the sake of clarity, only the steps and elements that are useful for an understanding of the embodiments described herein have been illustrated and described in detail. In particular, the design of integrated circuits is well known by those skilled in the art and certain components have not been described hereafter.

Unless indicated otherwise, when reference is made to two elements connected together, this signifies a direct connection without any intermediate elements other than conductors, and when reference is made to two elements coupled together, this signifies that these two elements can be connected or they can be coupled via one or more other elements.

In the following disclosure, unless otherwise specified, when reference is made to absolute positional qualifiers, such as the terms "front," "back," "top," "bottom," "left," "right," etc., or to relative positional qualifiers, such as the terms "above," "below," "upper," "lower," etc., or to qualifiers of orientation, such as "horizontal," "vertical," etc., reference is made to the orientation shown in the figures.

Unless specified otherwise, the expressions "around," "approximately," "substantially," and "in the order of" signify within 10% and preferably within 5%.

Figure 1:
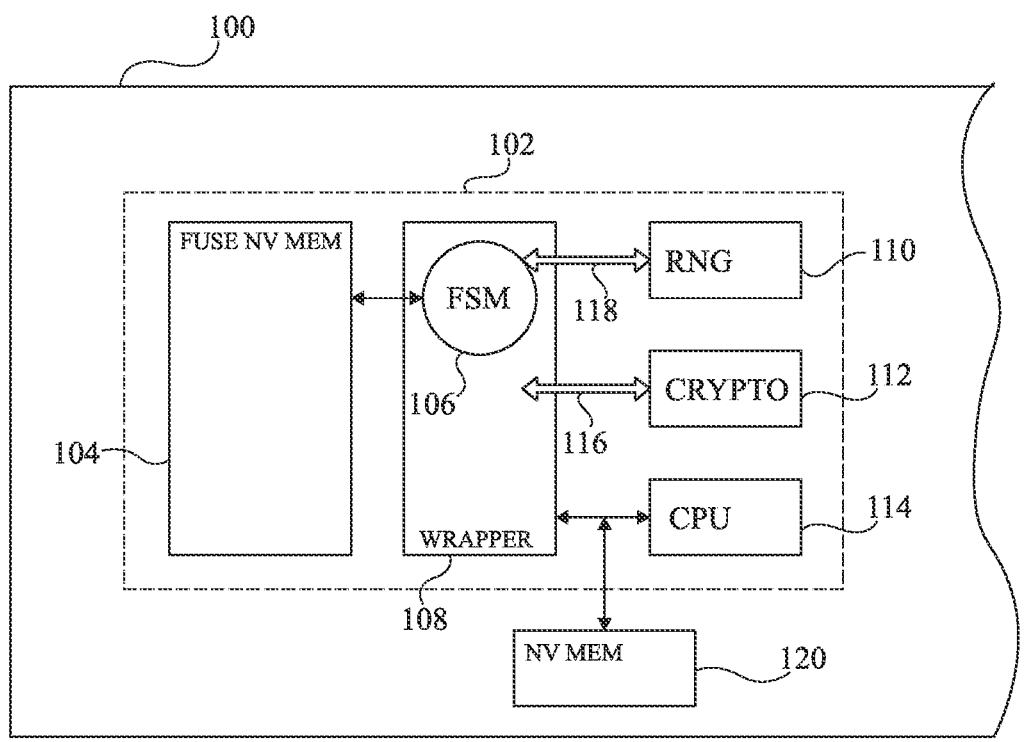
FIG. 1 is a schematic of an embodiment integrated circuit.

FIG. 1 very schematically shows in the form of blocks an embodiment of an electronic device 100 comprising an integrated circuit 102 of the type to which described embodiments apply as an example.

Electronic device 100 is, for example, an electronic board such as a microcircuit card, computer equipment, a microprocessor circuit, etc. In the applications targeted by the present disclosure, integrated circuit 102 comprises a non-rewritable non-volatile fuse memory (FUSE NV MEM) 104. By default, that is, at the end of the manufacturing of memory 104, all the fuse-type bits of memory 104 are in the same state 104, arbitrarily 0. This state corresponds, according to the native state of the fuse bits, for example, to a non-conductive or "off" state of the storage elements defining the bits. Data are stored in non-volatile memory 104 by switching the state of certain bits of the memory (of memory words) to inverse state 1, for example, corresponding to a conductive or "on" state of the corresponding storage elements.

The "0" or "1" designation of the respective non-conductive and conductive states of the memory bits is arbitrary, and another convention, for example, the inverse: 0 for conductive and 1 for non-conductive, may be adapted according to the application.

As the storage capacity of fuse memory 104 is limited, other data are stored in an external non-volatile memory 120 (NV MEM), for example, a flash memory. These data correspond, for example, to software codes or proprietary protocols ensuring the functionality of the electronic device. These data are used all along the electronic device's lifetime and are considered critical in terms of confidentiality.

The critical data are encrypted by a cryptographic processor (crypto engine) 112 (CRYPTO) of circuit 102 to protect the content of external non-volatile memory 120 and ensure its confidentiality in case of a hacking of the circuit.

In an embodiment, a cipher key used for that purpose is stored in the non-volatile memory 104 of circuit 102, which corresponds to a safe or secured environment. The cipher keys should become accessible outside of the circuit.

For this purpose and according to the described embodiments, integrated circuit 102 comprises a finite state machine 106 (FSM), coupled to a random number generator 110 (RNG) by a bus 118.

Random number generator 110 may be a pseudo-random number generator, such as a linear congruential generator, using recursive arithmetical sequences with a noisy behavior and a sufficiently long period to seem random. The quality of such a generator entirely depends on the arithmetical parameters used. Generator 110 may also be a true random number generator using a random physical source based, for example, on intrinsic properties of the material on which it is implanted.

According to the described embodiments, bus 118 exclusively couples finite state machine 106 to random number generator 110.

Finite state machine 106 is further coupled, typically by a data bus, to non-volatile memory 104. To ensure an accounting between data capable of being supplied by the random number generator 110 and the data stored in non-rewritable non-volatile memory 104, circuit 102 contains a wrapper 108 (WRAPPER). In embodiments, wrapper 108 itself contains finite state machine 106.

Cryptographic processor 112 is configured to decrypt, by using the cipher key contained in non-volatile memory 104, the critical data so that they can be used for the operation of the electronic device. Cryptographic processor 112 is coupled to a portion (not detailed in FIG. 1) of wrapper 108 by a data bus 116. Data bus 116 exclusively couples cryptographic processor 112 to wrapper 106.

The circuit further contains a non-secure multi-purpose processor 114 (CPU), typically coupled by a data bus, to a portion (not shown) of wrapper 108.

The external non-volatile memory 120 is wired to non-secure multi-purpose processor 114 and the portion of wrapper 108.

For example, the memory 120 is coupled by an external bus to the data bus that couples non-secure multi-purpose processor 114 to the portion of wrapper 108.

Figure 2:
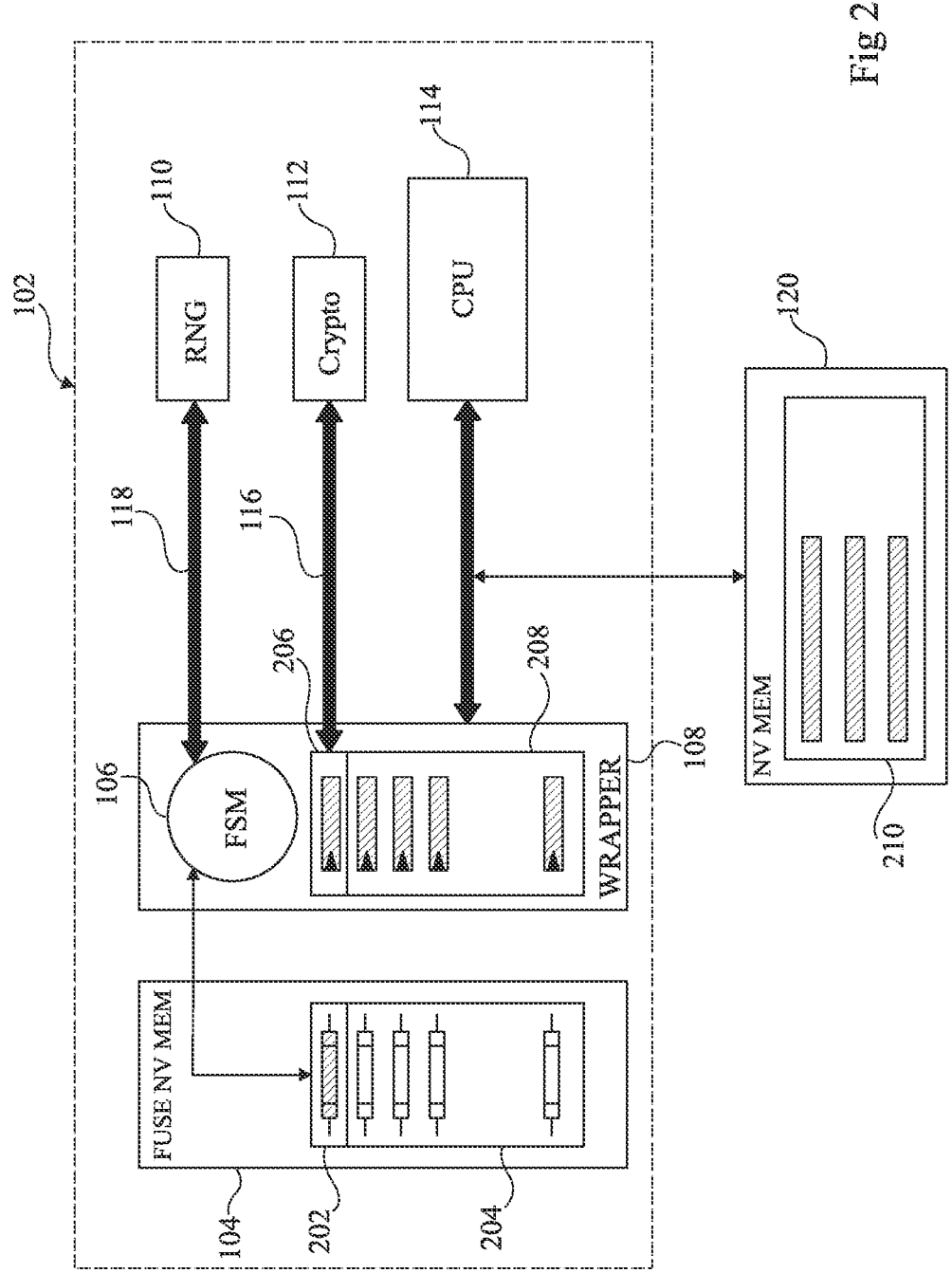
FIG. 2 is a schematic of an embodiment integrated circuit.

FIG. 2 schematically shows in the form of blocks, more detailed than in FIG. 1, an embodiment of an integrated circuit of the type to which described embodiments apply as an example.

At the end of the manufacturing, finite state machine 106 sends a request to random number generator 110, via bus 118. Generator 110 then generates a random value that it transmits, still via bus 118, to finite state machine 106. Bus 118 exclusively coupling finite state machine 106 to generator 110, multi-purpose processor 114 does not have access to the random value generated in this operation.

According to the described embodiments, it is provided for non-volatile fuse memory 104 to comprise a plurality of distinct memory areas.

A first area 202 is formed of a word of a plurality of bits (for example, 16 or 32 bits) that can only be programmed by finite state machine 106. Once the random value has been generated and transmitted to finite state machine 106, the latter stores this value in a portion of area 202 by programming the bits forming it.

A second area 204 of the non-volatile memory 104 is reserved for the storage of critical information. The storage in the non-volatile memory is, for example, executed by the non-secure multi-purpose processor 114.

In embodiments, the operation is performed by the final user of the circuit or by an intermediate entity between the manufacturer and this user.

The random value stored in memory area 202 is used as a cipher key. It will be used by cryptographic processor 112 for the ciphering or the deciphering of data stored in area 210 of the external non-volatile memory 120. This value must remain inaccessible to any processing unit other than cryptographic processor 112.

For this purpose, in embodiments, wrapper 108 contains, in addition to finite state machine 106, two distinct volatile storage elements 206 and 208. In embodiments, elements 206 and 208 are registers.

At each resetting or booting of the circuit, the content of area 202 is loaded into volatile storage element 206, and other fuse values in area 204 are loaded into register 208, before the resetting of non-secure multi-purpose processor 114 is over.

Storage element 206 is coupled by a dedicated data bus 116 to cryptographic processor 112. Data bus 216 exclusively couples element 206 to processor 112, whereby the data stored in storage elements 206 are accessible to no circuit component other than cryptographic processor 112.

Scan tests may be executed during the circuit lifetime, for example, in case of a malfunction of electronic device 100. However, the content of word 202 and volatile storage 206 should remain inaccessible outside the circuit. To execute a scan test, circuit 102 must enter scan mode.

In embodiments, scan tests can only be performed in scan mode. While in scan mode, non-volatile memory 104 is disconnected from the rest of the circuit to isolate the content of areas 202 and 204. In embodiments, any transition in or out of scan mode causes a chip reset. Thus, the content of volatile storage elements 206 and 208 are deleted when switching in or out of scan mode.

Figure 3:
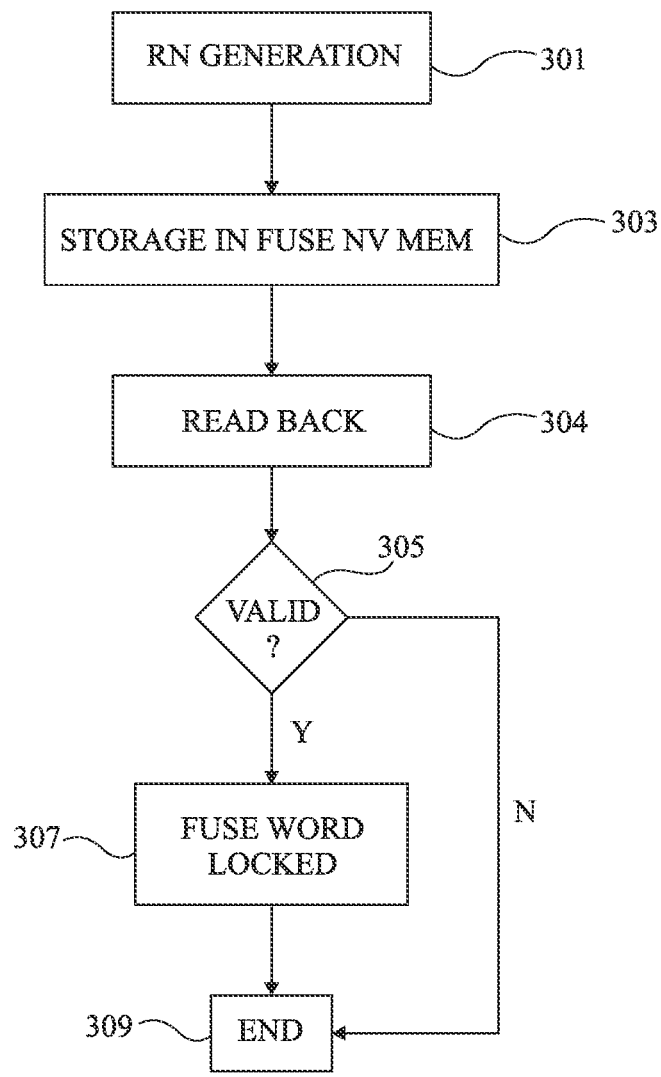
FIG. 3 is a flowchart of an embodiment method for creating and storing an encryption key.

FIG. 3 is a flowchart showing steps of an implementation mode of a creation and of the storage of an encryption key. When circuit 102 has just been manufactured, the finite state machine 106 can be invoked to send a request to random number generator 110. Random number generator 110 then generates a random value (block 301 RN GENERATION). The generated value is transmitted to finite state machine 106 via dedicated data bus 118. Data bus 118 exclusively couples random number generator 110 to finite state machine 106. Accordingly, the non-secure multi-purposes processor does not have access, in this operation, to the random value.

The finite state machine then verifies whether the random value is acceptable (e.g., whether it is not a value only formed of 0s or only formed of is in binary writing). If the quality is not considered acceptable by the finite state machine, the method regenerates a new random value. In the case where the quality of the random value is considered acceptable, finite state machine 106 stores it (block 303 STORAGE IN FUSE NV MEM) in non-volatile memory 104 by the programming of part of the bits of word 202.

Step 303 is immediately followed by step 304 (READ BACK) of reading of the stored value and of verification 305 (VALID?) against the generated value to ensure that the programming of the fuse bits has been performed correctly. These steps are carried out by finite state machine 106. If the two values are different (output N of block 305), there has been an error during the programming of the bits of word 202 by the finite state machine, and the method ends (block 309 END). If the two values match (output Y of block 305), finite state machine 106 programs additional bits of word 202 (block 307 FUSE WORD LOCKED). For example, if word 202 comprises 32 bits and if the storage of the random value occupies the 24 least significant bits of word 202, the finite state machine will program the remaining 8 most significant bits, for example, by switching them to state 1. This action locks word 202 and validates the cipher key thus stored, and the method ends (block 309 END).

The length of word 202 may vary according to the embodiments, just as the length of the generated cipher key. During the use of the circuit, only the portion of word 202 corresponding to the cipher key (to the random value) is read and used.

Figure 4:
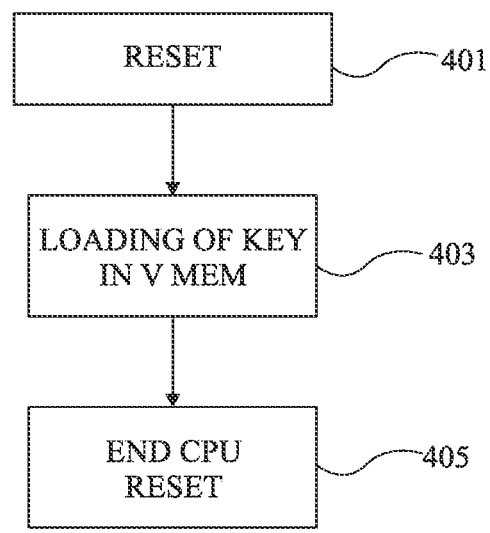
FIG. 4 is a flowchart of an embodiment method for booting or resetting.

FIG. 4 is a flowchart showing the steps followed by the circuit in booting or reset operation.

After the cipher key has been correctly stored (e.g., according to the steps illustrated in FIG. 3) in non-volatile memory 104, circuit 102 is reset (block 401 RESET).

In embodiments, once wrapper 108 emerges from the resetting, word 202, or the portion 202 corresponding to the random value generated at step 301 is loaded (block 403, LOADING OF KEY IN V MEM) into volatile memory elements 206. It should be reminded that volatile memory elements 206 are not accessible by multi-purpose processor 114 and are only accessible to cryptographic processor 112. The method ends at step 405 (END OF CPU RESET) when multi-purpose processor 114 has ended its reset.

The loading of the content of the volatile memory elements 206 by cryptographic processor 112 is performed over a dedicated data bus 116. Thus, multi-purpose processor 114 and, more generally, any component of circuit 102 other than cryptographic processor 112 never has access to the cipher key stored in volatile storage elements 206.

An advantage of the described embodiments is that no processing unit other than the cryptographic processor has access to the memories containing the cipher key. Such an access restriction considerably limits the possibilities of reading the critical data from the outside of the circuit.

Another advantage of the described embodiments is that they require no additional components to generate the cipher key. Indeed, a random number generator is generally present in such a circuit for other security purposes.

The fact that the random number is never visible allows the use of only one random number (one word). It has, therefore, the advantage (as compared with solutions where a plurality of random numbers have to be used and stored) that the random number can be of larger size and thus more secure.

Another advantage of the described embodiments is that the implementation of the finite state machine requires a simple combinational logic capable of being implemented in robust fashion.

Various embodiments and variants have been described. Those skilled in the art will understand that certain features of these various embodiments and variants may be combined, and other variants will occur to those skilled in the art.

Finally, the practical implementation of the described embodiments and variants is within the abilities of those skilled in the art based on the functional indications given hereabove. In particular, the size of the cipher key or of word 202 may vary.

Although the description has been described in detail, it should be understood that various changes, substitutions, and alterations may be made without departing from the spirit and scope of this disclosure as defined by the appended claims. The same elements are designated with the same reference numbers in the various figures. Moreover, the scope of the disclosure is not intended to be limited to the particular embodiments described herein, as one of ordinary skill in the art will readily appreciate from this disclosure that processes, machines, manufacture, compositions of matter, means, methods, or steps, presently existing or later to be developed, may perform substantially the same function or achieve substantially the same result as the corresponding embodiments described herein. Accordingly, the appended claims are intended to include within their scope such processes, machines, manufacture, compositions of matter, means, methods, or steps.

The specification and drawings are, accordingly, to be regarded simply as an illustration of the disclosure as defined by the appended claims, and are contemplated to cover any and all modifications, variations, combinations, or equivalents that fall within the scope of the present disclosure.

What is claimed is:

1. A method for operating an integrated circuit, the method comprising:
generating a random value by a random number generator circuit; and storing the random value in a memory area of a non-volatile fuse-type memory by a finite state machine, the finite state machine coupled to the random number generator circuit via a first dedicated bus, the memory area being only accessible by the finite state machine, wherein at each reset phase of the integrated circuit, a content of the memory area is loaded by the finite state machine into a volatile memory, wherein a transition of the integrated circuit in and out of a state, allowing execution of a scan test, generates deleting of content stored in the volatile memory, and wherein the non-volatile fuse-type memory is disconnected from the integrated circuit in response to the integrated circuit being in the state allowing execution of the scan test.

2. The method of claim 1, wherein the memory area can only be programmed by the finite state machine, and wherein the first dedicated bus exclusively couples the finite state machine to the random number generator circuit.

3. The method of claim 1, wherein a second dedicated bus exclusively couples the volatile memory to a first processor, and wherein the first processor is a cryptographic engine.

4. The method of claim 1, wherein the loading of the content of the memory area into the volatile memory is before a resetting of a second processor of the integrated circuit is complete, the second processor being a non-secure multi-purpose processor.

5. The method of claim 4, wherein the method further comprises loading, by the finite state machine, further values stored in a further area of the non-volatile fuse-type memory at each reset phase of the integrated circuit into further volatile memory, the further volatile memory being accessible by the second processor.

6. The method of claim 1, wherein the finite state machine and the volatile memory are contained in a wrapper.

7. The method of claim 1, wherein the finite state machine locks the memory area after storing the random value in response to the random value being stored corresponds to the random value generated by the random number generator circuit.

8. An integrated circuit, comprising:
a non-volatile fuse-type memory;
a random number generator circuit configured to generate a random value; and
a finite state machine coupled to the random number generator circuit by a first dedicated bus, the finite state machine configured to store the random value in a memory area of the non-volatile fuse-type memory, the memory area being only accessible by the finite state machine,
wherein at each reset phase of the integrated circuit, a content of the memory area is loaded by the finite state machine into a volatile memory, and
wherein the non-volatile fuse-type memory is disconnected from the integrated circuit in response to the integrated circuit being in a state allowing execution of a scan test.

9. The integrated circuit of claim 8, wherein the memory area can only be programmed by the finite state machine.

10. The integrated circuit of claim 8, wherein the first dedicated bus exclusively couples the finite state machine to the random number generator circuit.

11. The integrated circuit of claim 8, wherein a second dedicated bus exclusively couples the volatile memory to a first processor, and wherein the first processor is a cryptographic engine.

12. The integrated circuit of claim 8, wherein the finite state machine and the volatile memory are contained in a wrapper.

13. The integrated circuit of claim 8, wherein a transition of the integrated circuit in and out of the state allowing execution of the scan test generates deleting of the content stored in the volatile memory.

14. The integrated circuit of claim 8, wherein the finite state machine locks the memory area after storing the random value in response to the random value being stored corresponds to the random value generated by the random number generator circuit.

15. A device comprising an integrated circuit, the integrated circuit comprising:
a non-volatile fuse-type memory;
a random number generator circuit configured to generate a random value; and
a finite state machine coupled to the random number generator circuit by a first dedicated bus, the finite state machine configured to store the random value in a memory area of the non-volatile fuse-type memory, the memory area being only accessible by the finite state machine,
wherein at each reset phase of the integrated circuit, a content of the memory area is loaded by the finite state machine into a volatile memory, and
wherein the non-volatile fuse-type memory is disconnected from the integrated circuit in response to the integrated circuit being in a state allowing execution of a scan test.

16. The device of claim 15, wherein the memory area can only be programmed by the finite state machine.

17. The device of claim 15, wherein the first dedicated bus exclusively couples the finite state machine to the random number generator circuit, and wherein a second dedicated bus exclusively couples the volatile memory to a first processor, the first processor being a cryptographic engine.

18. The device of claim 15, wherein a transition of the integrated circuit in and out of the state, allowing execution of the scan test, generates deleting of the content stored in the volatile memory.

19. The device of claim 15, wherein the finite state machine locks the memory area after storing the random value in response to the random value being stored corresponds to the random value generated by the random number generator circuit.

20. The device of claim 15, wherein loading the content of the memory area into the volatile memory is before a resetting of a second processor of the integrated circuit is complete, the second processor being a non-secure multi-purpose processor.

* * * * *